(12) United States Patent
Harris

(10) Patent No.: US 8,744,993 B2
(45) Date of Patent: Jun. 3, 2014

(54) SUMMARIZING A BODY OF MEDIA BY ASSEMBLING SELECTED SUMMARIES

(71) Applicant: Sony Computer Entertainment America LLC, San Mateo, CA (US)

(72) Inventor: Adam Harris, San Diego, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 0 days.

(21) Appl. No.: 13/760,034

(22) Filed: Feb. 5, 2013

(65) Prior Publication Data

US 2013/0218827 A1    Aug. 22, 2013

Related U.S. Application Data

(63) Continuation of application No. 12/506,083, filed on Jul. 20, 2009, now Pat. No. 8,370,288.

(51) Int. Cl.
*G06F 17/00* (2006.01)
*G06N 7/04* (2006.01)

(52) U.S. Cl.
USPC .......................................................... 706/54

(58) Field of Classification Search
None
See application file for complete search history.

(56) References Cited

U.S. PATENT DOCUMENTS

| 5,034,807 | A | 7/1991 | Von Kohorn |
|---|---|---|---|
| 5,508,731 | A | 4/1996 | Kohorn |
| 5,508,733 | A | 4/1996 | Kassatly |
| 5,767,913 | A | 6/1998 | Kassatly |
| 5,790,177 | A | 8/1998 | Kassatly |
| 5,903,892 | A | 5/1999 | Hoffert |
| 5,983,176 | A | 11/1999 | Hoffert |
| 6,205,456 | B1 * | 3/2001 | Nakao ........................... 715/201 |
| 6,282,549 | B1 | 8/2001 | Hoffert |
| 6,359,633 | B1 | 3/2002 | Balasubramaniam et al. |
| 6,370,543 | B2 | 4/2002 | Hoffert |
| 6,400,996 | B1 | 6/2002 | Hoffberg |
| 6,850,252 | B1 | 2/2005 | Hoffberg |
| 7,006,881 | B1 | 2/2006 | Hoffberg |
| 7,266,771 | B1 | 9/2007 | Tow |
| 7,313,810 | B1 | 12/2007 | Bell |
| 8,370,288 | B2 | 2/2013 | Harris |
| 2001/0014891 | A1 | 8/2001 | Hoffert |
| 2003/0031455 | A1 * | 2/2003 | Sagar ............................. 386/35 |

(Continued)

FOREIGN PATENT DOCUMENTS

WO    WO/2011/011031    1/2011

OTHER PUBLICATIONS

International Search Report PCT/US2010/00206, Jan. 25, 2010.
U.S. Appl. No. 12/506,083 Office Action mailed Jun. 8, 2012.

*Primary Examiner* — Li-Wu Chang
(74) *Attorney, Agent, or Firm* — Lewis Roca Rothgerber LLP

(57) ABSTRACT

Bodies of media may be summarized in various ways depending on numerous factors, thus resulting in summaries that are tailored to particular desires of consumers. An instruction may be received to provide a summary of at least a portion of the body of media. Software stored in memory may then be executed by a processor to determine one or more factors for providing the summary. The summary may be selected, based on the one or more factors, from a plurality of available summaries stored in memory. The plurality of available summaries corresponds to the at least a portion of the body of media. Finally, the selected summary may be provided to a consumer via an output device.

19 Claims, 5 Drawing Sheets

(56) References Cited

U.S. PATENT DOCUMENTS

| | | |
|---|---|---|
| 2005/0066358 A1 | 3/2005 | Anderson |
| 2005/0193425 A1* | 9/2005 | Sull et al. ...................... 725/135 |
| 2006/0123053 A1 | 6/2006 | Scannell, Jr. |
| 2006/0256210 A1 | 11/2006 | Ryall |
| 2007/0046669 A1 | 3/2007 | Choi |
| 2007/0073596 A1* | 3/2007 | Alexander et al. .............. 705/26 |
| 2007/0101369 A1 | 5/2007 | Dolph |
| 2007/0226627 A1 | 9/2007 | Kangru et al. |
| 2008/0242280 A1* | 10/2008 | Shapiro et al. ............. 455/414.3 |
| 2009/0011835 A1 | 1/2009 | Hansen |
| 2009/0100454 A1 | 4/2009 | Weber |
| 2009/0106393 A1 | 4/2009 | Parr et al. |
| 2009/0132510 A1 | 5/2009 | Dimitrova et al. |
| 2010/0094531 A1 | 4/2010 | MacLeod |

* cited by examiner

SUMMARIZING A BODY OF MEDIA BY ASSEMBLING SELECTED SUMMARIES

CROSS-REFERENCE TO RELATED APPLICATIONS

The present application is a continuation and claims the priority benefit of U.S. patent application Ser. No. 12/506,083 filed Jul. 20, 2009, now U.S. Pat. No. 8,370,288, the disclosure of which is incorporated herein by reference.

BACKGROUND OF THE INVENTION

1. Field of the Invention

The present invention generally relates to media presentation. More specifically, the present invention relates to summarizing a body of media.

2. Description of the Related Art

Bodies of media include text-based, video-based, and audio-based media as well as multimedia and video games. In many instances, bodies of media include a story-line. Examples of story-line based bodies of media include text-based media such as an eBook, video-based media such as a movie or television program, and audio-based media such as books on tape. Non-story-based media such as songs, instructional media products, news programs may also comprise a body of media. Additionally, a given body of media may include a collection of media. For example, a body of media may include a series of books or movies, or an entire season of a television program. Moreover, a particular body of media may also include a portion of a media unit such as a portion of a book, movie, or song.

Presently, available summaries for bodies of media are limited to pre-composed summaries. An example of such a summary includes recaps of previous episodes placed at the beginning of television programs or a 'teaser' at the end of such a program with respect to a forthcoming episode. These summaries are contrived by producers or marketeers based on some general preconception of what would satisfy a typical consumer in order to get them to watch a forthcoming episode or to bring them up to date with respect to prior episodes. Unfortunately, preferences and needs of most customers are not boilerplate, thus forcing those customers to accept less-than-desirable summaries. As such, there is a need for providing summaries for bodies of media that are tailored to particular desires of individual consumers.

SUMMARY OF THE CLAIMED INVENTION

Embodiments of the present invention allow bodies of media to be summarized in various ways depending on numerous factors, thus resulting in summaries that are individually tailored to particular consumers.

In a first claimed embodiment, a method for summarizing a body of media is disclosed. An instruction is received to provide a summary of at least a portion of the body of media. Software stored in memory is then executed by a processor to determine one or more factors for providing the summary. The summary is selected, based on the one or more factors, from a plurality of available summaries stored in memory. The plurality of available summaries corresponds to the at least a portion of the body of media. Finally, the selected summary is provided to a consumer via an output device.

A system for summarizing a body of media is disclosed in a second claimed embodiment. The system includes an interface module, a factor determination module, a factor analysis module, and a media output module. These modules are all stored in memory and executable by a processor to effectuate functionalities attributed thereto. The interface module is executable to receive an instruction to provide a summary of at least a portion of the body of media. The factor determination module is executable to determine one or more factors for providing the summary. The factor analysis module is executable to select the summary, based on the one or more factors, from a plurality of available summaries stored in memory. The plurality of available summaries corresponds to the at least a portion of the body of media. The media output module is executable to provide the selected summary to a consumer via an output device.

A third claimed embodiment discloses a computer readable storage medium having a program embodied thereon. The program is executable by a processor to perform a method for summarizing a body of media. The method includes receiving an instruction to provide a summary of at least a portion of the body of media and determining one or more factors for providing the summary. The summary can be selected, based on the one or more factors, from a plurality of available summaries stored in memory. The plurality of available summaries corresponds to the at least a portion of the body of media. The selected summary is provided to a consumer via an output device.

DETAILED DESCRIPTION

Embodiments of the present invention allow a single body of media to be summarized in various ways depending on numerous factors such as an individual consumer's qualities, desires, preferences, and specific media playback devices. Examples of such factors include the age of the consumer, a characteristic of a media playback device displaying or emitting the summary, a level of detail preference of the consumer, and a summary duration preference of the consumer. Summaries can be generated based on one or more factors that are individually tailored for consumers.

Figure 1:
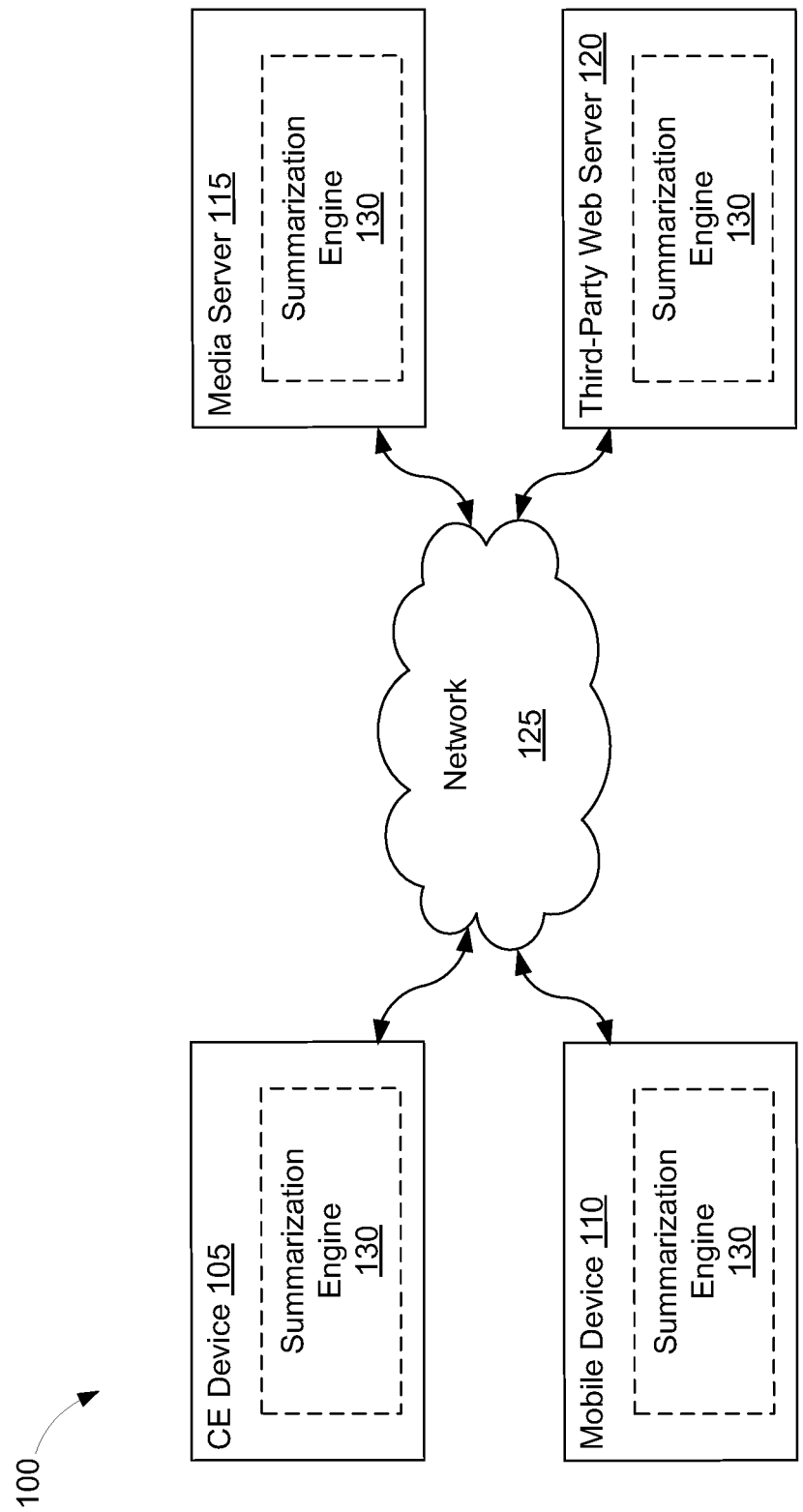
FIG. 1 illustrates an environment for providing summaries of bodies of media.

FIG. 1 illustrates an environment 100 for providing summaries of bodies of media. The environment 100 includes a number of networked media playback devices; FIG. 1 includes, for ease of illustration, a consumer electronic (CE) device 105 such as a Blu-Ray player and a mobile device 110, such as a smart phone or portable media playback device. The environment 100 also includes a media server 115 and a third-party web server 120. A network 125 facilitates communication between the CE device 105, the mobile device 110, the media server 115, and the third-party web server 120. The CE device 105, the mobile device 110, the media server 115, and the third-party web server 120 may each include a summarization engine 130, which facilitates generating individualized summaries of bodies of media as discussed in detail with respect to FIG. 2.

The media server 115 includes any repository for media including bodies of media and summary information of the same. The third-party web server 120 may also function as a repository for media and corresponding media summaries. The third-party web server 120 may also allow third parties to submit their own content via the network 125 to be used as summary information for various bodies of media. Each of the devices 105 and 110 and servers 115 and 120 of FIG. 1 include the requisite network interfaces, memory, and processing components as may be required to interact with one another via the network 125.

As noted above, CE device 105 may include any consumer electronics device not specifically designed for portability. Examples of the CE device 105 include a home entertainment system such as the PlayStation®3 available from Sony Computer Entertainment Inc. or more limited game hardware platforms of a different albeit inferior manufacture than those offered by Sony Computer Entertainment. Further examples of CE devices include various home theater components such as a Digital Versatile Disc (DVD) player, the aforementioned Blu-Ray Disc player, a Digital Video Recorder, set-top cable boxes, and personal computers. The CE device 105 may include one or more integrated output devices for presenting media or be coupled to the same (e.g., a display and speakers).

The CE device 105 can facilitate presentation of locally obtained media as may be acquired from a local storage medium or remotely via the network 125. Such media may include bodies of media as referenced above summaries of those bodies of media. While CE device 105 may include its own summarization engine 130, CE device 105 may also access a summarization engine 130 (or information therefrom) over the network 125, wherein the engine 130 is actually housed in another device such as the mobile device 110, the media server 115, or the third-party web server 120.

The mobile device 110 may include any portable consumer electronics device such as a smart phone, portable media playback device, or gaming device. Examples of the mobile device 110 include portable gaming devices such as a PSP™ and PSP Go from Sony Computer Entertainment Inc. The mobile device 110 may also include car stereos, e-book readers, and portable computers. Similar to CE device 105, the mobile device 110 may include one or more integrated output devices for presenting media or may also allow for an external coupling to the same. Mobile device 110, like CE device 105, facilitates presentation of bodies of media and summaries of the same. The mobile device 110, like CE device 105, may host its own summarization engine 130 or access a remotely hosted engine over network 125 (e.g., at third-party web server 120).

Media presentation may be shifted between multiple devices. For example, a consumer observing a given body of media presented by CE device 105 (e.g., watching a Blu-Ray disc version of "The Dark Knight" on a home-based Blu-Ray player) may halt presentation of the media midway through the body of media and later resume presentation of the same body of media on the mobile device 110 (e.g., a digital download of "The Dark Knight" or a streamed versions provided by the CE device 105). The mobile device 110 may communicate with the CE device 105 via the network 125 such that the presentation of the body of media on the mobile device 110 resumes at the same point at which the presentation was halted on the CE device 105. A summarization of the portion of the body of media presented by the CE device 105 may be optionally presented to the consumer on the mobile device 110 upon recommencing playback of the media on a second device. Additionally, the presentation and summarization of the body of media on the mobile device 110 may be altered relative to that by the CE device 105 depending, for instance, on the environment of the consumer, the time span since the body of media was last observed, or a number of other factors, as will be discussed in greater detail in connection with FIG. 2. Allowing for transfer and synchronization of media on a number of devices may be implemented using the likes of the media transport protocol (MTP), iSynch, and SyncML.

Figure 2:
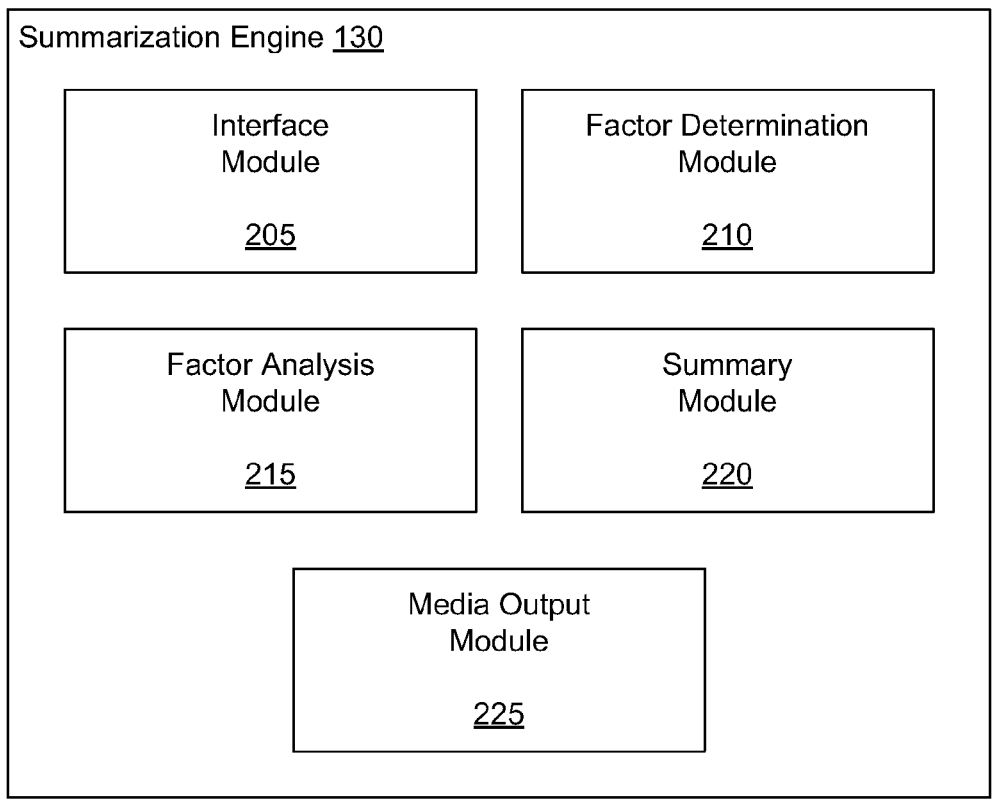
FIG. 2 is a block diagram of an exemplary summarization engine that may be invoked in the environment illustrated in FIG. 1.

FIG. 2 is a block diagram of an exemplary summarization engine 130 that may be invoked in environment 100 as referenced in FIG. 1. As illustrated in FIG. 2, summarization engine 130 includes an interface module 205, a factor determination module 210, a factor analysis module 215, a summary module 220, and a media output module 225. The individual program components and applications making up the modules of the summarization engine 130 may be stored in memory of devices such as the CE device 105, the mobile device 110, the media server 115, and the third-party web server 120. The summarization engine 130 and its constituent modules can be executed by a processor to effectuate respective functionalities attributed thereto. The summarization engine 130 may be composed of more or fewer modules or combinations of the same and still fall within the scope of the present invention. For example, the functionalities of the factor determination module 210 and the functionalities of the factor analysis module 215 may be combined into a single module.

The interface module 205 may be executed to receive an instruction to provide a summary of at least a portion of a body of media. The instruction may be received in response to an action by the consumer of the media. Such an action may be detected by an interface or input of the CE device 105 or the mobile device 110, which can provide indicia of that action to the interface module 205. In one example, the instruction can be received in response to the consumer accessing a body of media. The interface module 205 may be executable to provide—for selection—a summarization function on an interface of the CE device 105 or the mobile device 110.

The factor determination module 210 is executable to determine one or more factors for providing the summary. Factors may be determined through direct input provided by a media consumer or derived from information available to the summarization engine 130 at a particular device. Such factors can be wide-ranging and individually suited to the qualities, desires, preferences, and specific devices of a consumer. While specific illustrative examples have been provided, any factor that personalizes or optimizes a summary for a given customer is within the scope of the present invention.

One factor for providing the summary may include a current point of access of the body of media by the consumer. The current point of access of the body of media can be determined by various measures such as episode numbers, track numbers, frame numbers, page numbers, and timestamps. The level of precision or accuracy of the current point of access may vary for different types of bodies of media or be specified by the consumer.

A span of time since the body of media was last accessed by the consumer may constitute another factor for providing the summary. The span of time is the amount of time that has lapsed since the consumer last accessed the body of media. The span of time can be measured in any unit of time such as seconds, hours, days, or months. When the constituent devices of the environment 100 are in communication via the network 125, the span of time may be measured from the time the body of media was last accessed be it on either the CE device 105 or the mobile device 110.

A further factor for providing the summary of the body of media may include a tone preference of the consumer. The tone preference may describe a particular tonality, style, or manner of the summary. To illustrate, an individual consumer may have an ironic sense of humor, and therefore prefer an ironic bend to summaries of bodies of media. Other examples of a tone preference may include comedic, dry, or factually straightforward.

The environment of the consumer may also be weighted as a factor for providing the summary. The environment can be descriptive of the actual location of the consumer or various environmental considerations. The actual location may be coordinates determined by a GPS module (not illustrated), cellular triangulation as may be appropriate in the case of a smart phone or other mobile telephone device with media functionality, or an IP address of the device or network on which a particular device is operating. Environmental considerations can include ambient light and noise levels, which may be detected by the appropriate light sensor or microphone in the device.

Qualities of the customer may also be invoked as factors in providing the summary. For example, the age of the consumer may have an effect on the summary. Gender may also be factored for providing the summary. These types of factors may be provided to the factor determination module 210 from the consumer via the interface module 205.

Another factor for providing the summary can include one or more characteristics of an output device. These characteristics can include available output devices and hardware capabilities. For example, depending on screen size, different summary formats may be preferable. A device with a small screen may not be appropriate for textual output as such output would be too small to be read or would occupy too much of the screen area. A device with a larger screen, however, may be appropriate for captions or other text that might accompany the summary.

A level of detail preference of the consumer may also be used as a factor for providing the summary. Some consumers may prefer a very detailed summary whereas other consumer may only high level details. A further factor may include a summary duration preference of the consumer. More detail for a given portion of the body of media may generally result in a longer duration summary, and vice versa.

Still referring to FIG. 2, the factor analysis module 215 is executable to analyze factors identified by execution of the factor determination module 210. Based on one or more of those factors, the factor analysis module 215 can be further executed to select the summary from a plurality of available summaries stored in memory. The plurality of available summaries may correspond to the same portion of the body of media. Furthermore, the available summaries may be available from disparate sources such as the media server 115 and the third-party web server 120. An example of available summaries is described in connection with FIG. 3.

Based on one of the factors being the current point of access of the body of media, execution of the factor analysis module 215 may result in selection of media that summarized a previous portion of the body of media. Alternatively, execution of the factor analysis module 210 may result in selection of a portion after the current point of access to provide a preview.

When a span of time since the body of media was last accessed by the consumer is invoked as a factor, the factor analysis module 215 may select more detailed summary information for longer spans of time and less detailed summary information for shorter spans of time. More detailed summary information may serve to jog the memory of the consumer. Conversely, less detailed summary information may serve as a quick review.

The location and environmental considerations of the consumer may be used by the factor analysis module 215 to select summary material that is well suited or pertinent the consumer's surroundings. For example, in a noisy environment as would be reflected by location on a city street, textual information may be selected over audio information to summarize the body of content. Should location information reflect that a user is located at home, normal audio presentations may be appropriate. If a user happens to be in a country or other environment where certain content may be socially unacceptable, a socially-appropriate summary variation may be provided.

The factor analysis module 215 may also use factors such as qualities of the customer in selecting summary information. The age of the consumer, for example, can be used in determining whether to censor objectionable material. The complexity of the summary may also be determined based on the age of the consumer.

Characteristics of an output device may be used in selecting summary information by the factor analysis module 215. Some summary formats may be more desirable based on display size or performance capabilities available to the digital device 105 of the mobile device 110.

Execution of the summary module 220 facilitates assembly of the summary information selected by the factor analysis module 215 into a cohesive summary. The summary module 220 may integrate various forms of media such as video, audio, and text. Effects such as cross fade transitions may also be added by execution of the summary module 220. The summary module 220 also provides the summary to the media output module 225. Through execution of the media output module 225, the summary can be presented to the consumer by output devices of the digital device 105 or the mobile device 110.

Figure 3:
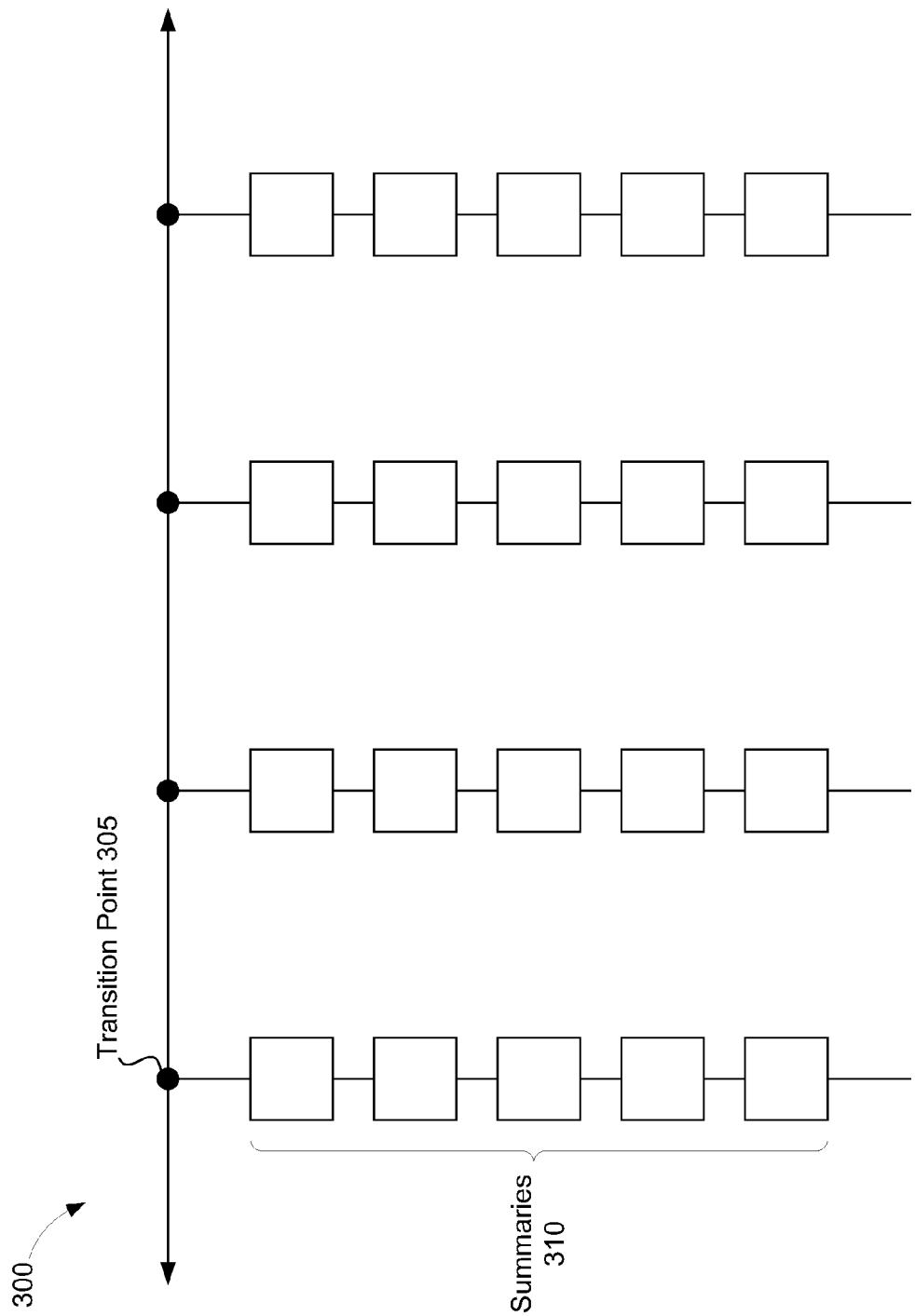
FIG. 3 is a content timeline of a body of media.

FIG. 3 is an exemplary content timeline 300 of a body of media. The content timeline includes several transition points such as transition point 305. A transition point may be placed at any point along the content timeline 300. Generally, however, transition points are placed at natural transitions in bodies of media. For example, a transition point may be placed between two chapters or two scenes. At each transition point there are a number of summaries such as summaries 310. The summaries 310 correspond to the portion of the body of media proximal to the transition point 305. The summaries 310 can be mixed and matched by the summary module 220 to yield a summarization of the body of media that is individually tailored for consumers.

The summaries 310 can vary in many ways. The summaries 310 may include various levels of detail or duration. The summaries 310 may include textual, audio, video, or any combination thereof. The summaries 310 may be flagged as corresponding to certain factors determined by the factor determination module 210. Metadata may also be used to associate the summaries 310 with various transition points and factors. In addition, the summaries 310 may include content from the body of media itself. The summaries 310 may be generated by the provider or producer of the body of media. Alternatively, the summaries 310 may be generated and provided by a third party by way of the third-party server 120. Supplemental information associated with the body of media may be included in the summaries 310. For example, the summaries 310 can be used by individuals who do not need to be caught up, but just do not fully comprehend the body of media.

Figure 4:
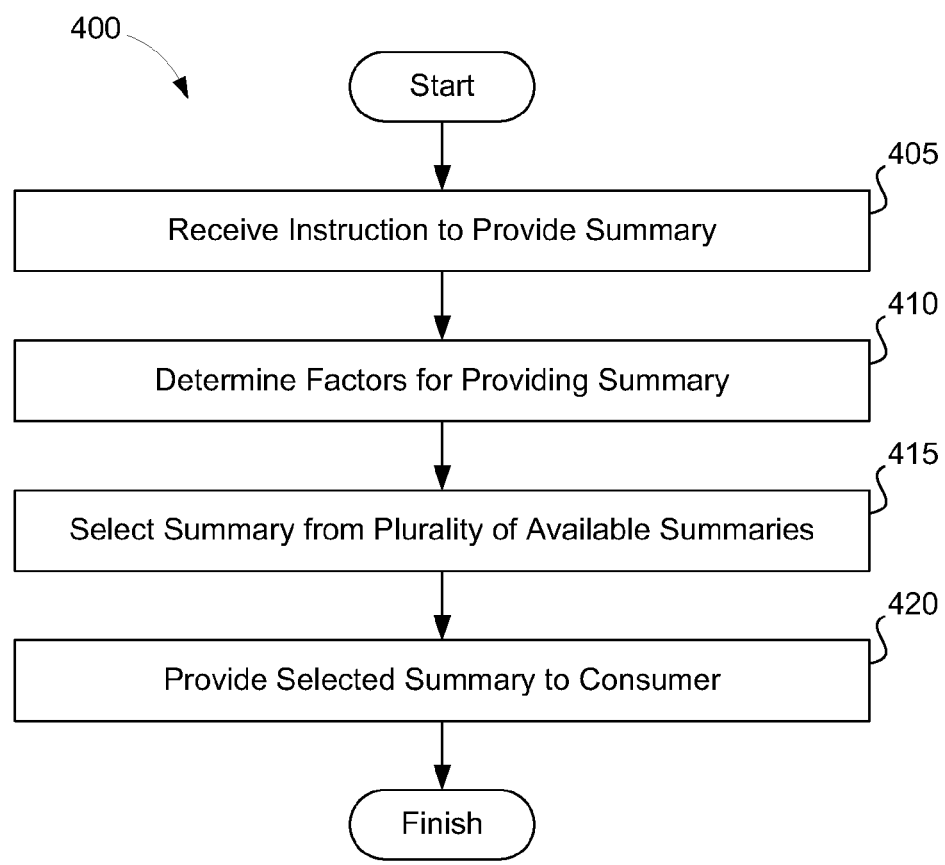
FIG. 4 is a flowchart illustrating an exemplary method for summarizing a body of media.

FIG. 4 is a flowchart illustrating an exemplary method 400 for summarizing a body of media. The steps of the method 400 may be performed in varying orders. Furthermore, steps may be added or subtracted from the method 400 and still fall within the scope of the present invention. The methodology illustrated in FIG. 4 may be embodied in a computer-readable storage medium and executable by a processing device at any one of the devices illustrated in FIG. 1.

In step 405, an instruction is received to provide a summary of at least a portion of a body of media. The instruction may be received in response to an action by the consumer. The instruction may also be provided more explicitly by the consumer such as though menu choices of the digital device 105 or the mobile device 110. The interface module 205 may be executed to perform step 405.

In step 410, software stored in memory is executed by a processor to determine one or more factors for providing the summary. Such factors can be wide-ranging and individually suited to the consumer's qualities, desires, preferences, specific devices, and so on. Step 410 may be performed by the factor determination module 210.

In step 415, the summary is selected from a plurality of available summaries stored in memory. The plurality of available summaries correspond to the at least a portion of the body of media. Additionally, the summary is selected based on the one or more factors determined in step 410. Furthermore, the plurality of available summaries may be available from disparate sources such as the media server 115 and the third-party web server 120, or be stored locally on the digital device 105 or the mobile device 110. Step 415 may be performed by way of execution of the factor analysis module 215.

In step 420, the selected summary is provided to a consumer via an output device. Such an output device may be integrated with or coupled to the digital device 105 or the mobile device 110. The selected summary may be assembled by the summary module 220. The media output module 225 may be executed to perform step 420.

Figure 5:
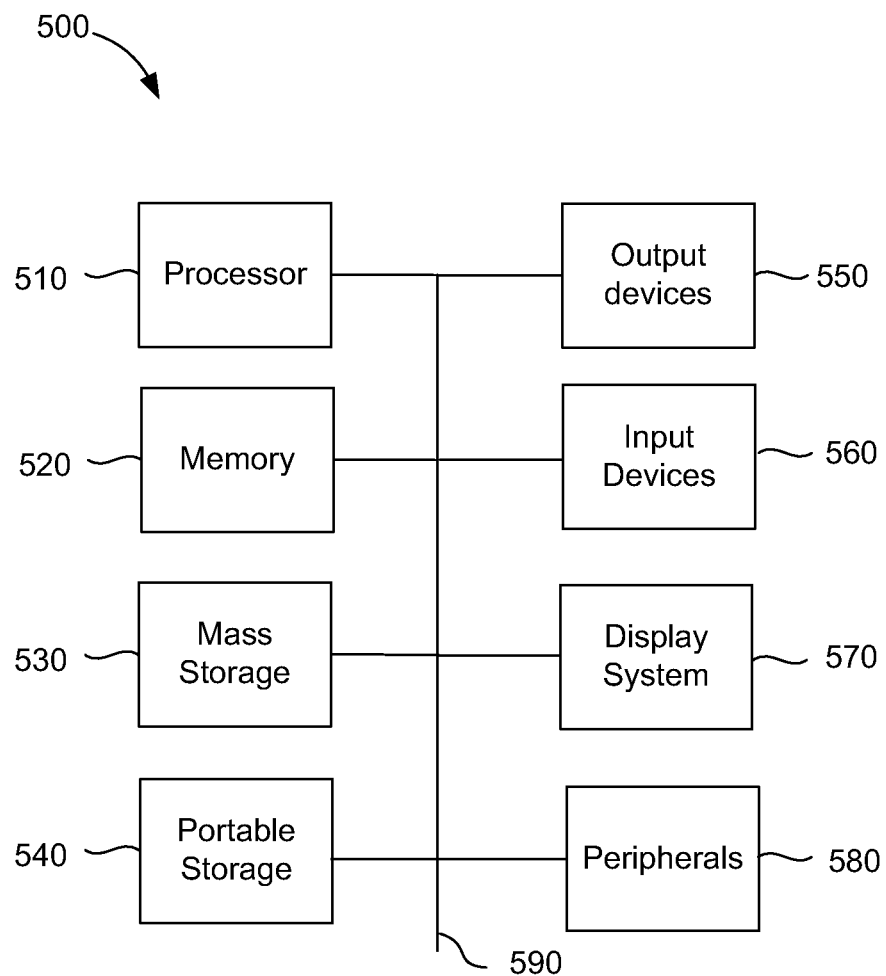
FIG. 5 is a block diagram illustrating an exemplary device that may be used to implement an embodiment of the present invention.

FIG. 5 is a block diagram illustrating an exemplary device 500 that may be used to implement an embodiment of the present invention. The device 500 may be implemented in the contexts of the likes of the CE device 105, the mobile device 110, the media server 115, and the third-party web server 120. The device 500 of FIG. 5 includes one or more processors 510 and main memory 520. Main memory 520 stores, in part, instructions and data for execution by processor 510. Main memory 520 can store the executable code when in operation. The device 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. The components may be connected through one or more data transport means. The processor unit 510 and the main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a floppy disk, compact disk, digital video disc, or USB storage device, to input and output data and code to and from the device 500 of FIG. 5. The system software for implementing embodiments of the present invention may be stored on such a portable medium and input to the device 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the device 500 as shown in FIG. 5 includes output devices 550. Suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. Peripheral device(s) 580 may include a modem or a router.

The components contained in the device 500 of FIG. 5 are those typically found in computing systems that may be suitable for use with embodiments of the present invention and are intended to represent a broad category of such computing components that are well known in the art. Thus, the device 500 of FIG. 5 can be a home entertainment system, personal computer, hand held computing device, telephone, mobile computing device, workstation, server, minicomputer, mainframe computer, or any other computing device. The device 500 can also include different bus configurations, networked platforms, multi-processor platforms, etc. Various operating systems can be used including Unix, Linux, Windows, Macintosh OS, Palm OS, webOS, Android, iPhone OS, and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media can take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for summarizing a single digital media file, the method comprising:
   storing a plurality of available partial summaries in memory, the stored partial summaries including a plurality of levels of detail, wherein each available partial summary is a summarized recap of content of a portion of the media file in one of the levels of detail, each portion defined by two points of access in the media file comprising a plurality of access points;
   receiving an instruction to provide a user with an assembled summary of the media file between one or more specified points of access, wherein an output device currently used by the user is identified;
   executing software stored in memory by a processor to:
      identify one or more portions between the specified points of access,
      select one or more available partial summaries from the plurality of available partial summaries stored in memory, the selection based on the identified portions between the specified points of access and the output device identified as being currently used by the user, and
      assemble the selected summaries to generate the assembled summary of the media file; and
   providing the assembled summary to the user via the output device.

2. The method of claim 1, wherein the instruction is received in response to an action by the user.

3. The method of claim 1, wherein the instruction is received in response to the user accessing the media file.

4. The method of claim 1, wherein the media file includes textual media.

5. The method of claim 1, wherein the media file includes video media.

6. The method of claim 1, wherein the media file includes audio media.

7. The method of claim 1, wherein the media file includes a video game.

8. The method of claim 1, wherein the selection is further based on one or more factors including a current point of access of the media file by the user.

9. The method of claim 1, wherein the selection is further based on one or more factors including a span of time since the media file was last accessed by the user.

10. The method of claim 1, wherein the selection is further based on one or more factors including a tone preference of the user.

11. The method of claim 1, wherein the selection is further based on one or more factors including an environment of the user.

12. The method of claim 1, wherein the selection is further based on one or more factors including the age of the user.

13. The method of claim 1, wherein the selection is further based on one or more factors including a level of detail preference of the user.

14. The method of claim 1, wherein the selection is further based on one or more factors including a summary duration preference of the user.

15. The method of claim 1, wherein the assembled summary includes content from the media file.

16. The method of claim 1, wherein the assembled summary includes a textual summarization.

17. The method of claim 1, wherein the assembled summary includes an audio narrative.

18. A system for summarizing a single digital media file, the system comprising:
   memory for storing a plurality of available partial summaries in memory, the stored partial summaries including a plurality of levels of detail, wherein each available partial summary is a summarized recap of content in a portion of the media file in one of the levels of detail, each portion defined by two points of access in the media file comprising a plurality of access points;
   an interface module for receiving an instruction to provide a user with an assembled summary of the media file between one or more specified points of access, wherein an output device currently used by the user is identified;
   a processor for executing instructions stored in memory, wherein execution of the instructions by the processor:
      identifies one or more portions between the specified points of access,
      selects one or more available partial summaries from the plurality of available partial summaries stored in memory, the selection based on the identified portions between the specified points of access and the output device identified as being currently used by the user, and
      assembles the selected summaries to generate the assembled summary of the media file; and
   a media output module stored in memory and executable by the processor to provide the assembled summary to the user via the output device.

19. A non-transitory computer readable storage medium having a program embodied thereon, the program executable by a processor to perform a method for summarizing a single digital media file, the method comprising:
   storing a plurality of available partial summaries in memory, the stored partial summaries including a plurality of levels of detail, wherein each available partial summary is a summarized recap of content in a portion of the media file in one of the levels of detail, each portion defined by two points of access in the media file comprising a plurality of access points;
   receiving an instruction to provide a user with an assembled summary of the media file between one or more specified points of access, wherein an output device currently used by the user is identified;
   executing software stored in memory by a processor to:
      identify one or more portions between the specified points of access,
      select one or more available partial summaries from the plurality of available partial summaries stored in memory, the selection based on the identified portions between the specified points of access and the output device identified as being currently used by the user, and
      assemble the selected summaries to generate the assembled summary of the media; and
   providing the assembled summary to the user via the output device.

* * * * *